United States Patent [19]

Baier et al.

[11] Patent Number: 4,515,027

[45] Date of Patent: May 7, 1985

[54] UNBALANCE VIBRATOR

[75] Inventors: Heinz Baier, Willich; Hans W. Kürten, Ratingen; Hans-Georg Waschulewski, Mettmann, all of Fed. Rep. of Germany

[73] Assignee: Losenhausen Machinenbau AG, Dusseldorf, Fed. Rep. of Germany

[21] Appl. No.: 454,951

[22] Filed: Dec. 30, 1982

[30] Foreign Application Priority Data

Jan. 29, 1982 [EP] European Pat. Off. ........ 82710002.5

[51] Int. Cl.[3] .............................................. F16H 33/08

[52] U.S. Cl. .......................................... 74/87; 74/61; 74/573 R; 192/105 A

[58] Field of Search .................... 192/105 BB, 105 A; 74/573 R, 87, 61

[56] References Cited

U.S. PATENT DOCUMENTS

| | | | |
|---|---|---|---|
| 2,240,649 | 5/1941 | Henschel | 192/105 BB |
| 2,673,651 | 3/1954 | Plant | 74/87 |
| 2,860,783 | 11/1958 | Johnson | 209/366.5 |
| 3,598,029 | 8/1971 | Paramythioti | 74/87 |
| 4,121,472 | 10/1978 | Vural et al. | 192/105 A |
| 4,236,417 | 12/1980 | Riedl | 74/87 |
| 4,262,549 | 4/1981 | Schwellenbach | 74/87 |
| 4,353,261 | 10/1982 | Salani | 74/61 |

FOREIGN PATENT DOCUMENTS

| | | |
|---|---|---|
| 529896 | 7/1954 | Belgium . |
| 1285777 | 3/1967 | Fed. Rep. of Germany . |
| 1601552 | 10/1970 | France . |
| 2382950 | 3/1977 | France . |

*Primary Examiner*—Kenneth J. Dorner
*Attorney, Agent, or Firm*—Lee, Smith & Zickert

[57] ABSTRACT

An unbalance vibrator having a shaft 2, with a flyweight 3 rigidly connected thereto, which shaft 2 is mounted in a bearing housing 1, comprises on both sides of this connecting flyweight movable flyweights 5 with flyweight bodies 6 nearly semicircular in cross section and guiding rings 7 nearly semicircular in cross section. The shaft 2 comprises a radial bore on diametrically opposite sides, into which a dog 8 is screwed, and a blind bore 11, into which a locking member 12 is retracted by action of a spring 17. The radial bore 3 and the blind bore 11 are angularly spaced by 90° with respect to the center plane of the flyweight 3 rigidly connected. When the shaft 2 is rotating, the locking member 12 extends from the blind bore 11, such that the movable flyweights 5 are held between the dogs 8 and the locking members 12. The locking members 12 are subjected to hysteresis and are retracted at a rotary speed, which is lower than the loading rotary speed.

6 Claims, 2 Drawing Figures

UNBALANCE VIBRATOR

Figure 1:
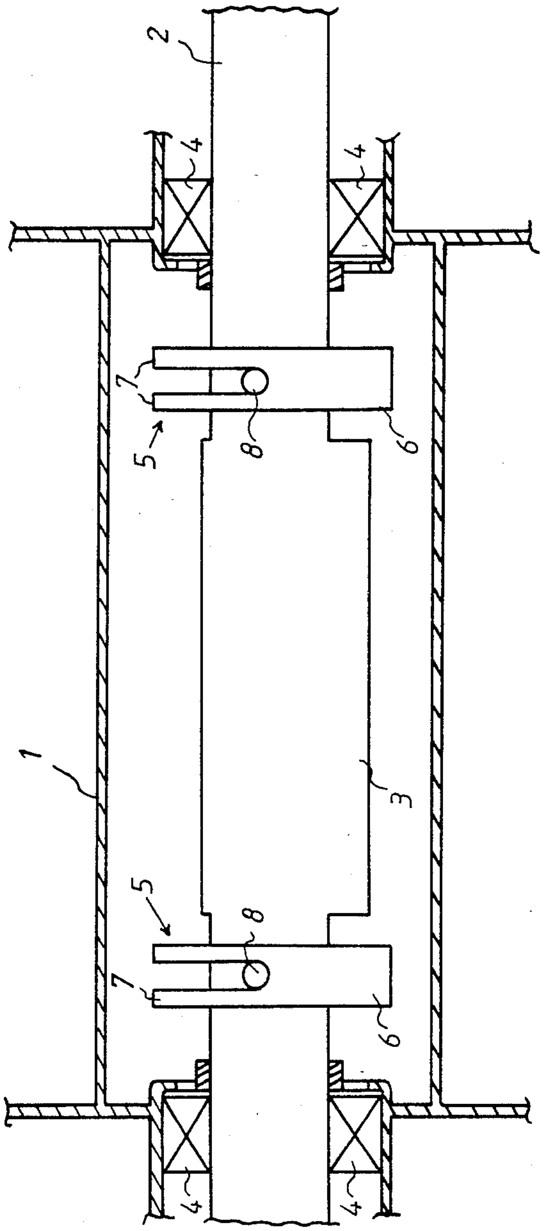

The invention relates to an unbalance vibrator having a rotating shaft and a flyweight rigidly connected thereto, at least one movable flyweight freely rotatable relative to the shaft and generally sector-shaped, and a dog interacting with the movable flyweight when the shaft is rotating and taking the movable flyweight along in that way, that the unbalance is larger with one direction of rotation of the shaft, and the unbalance is smaller with the other direction of rotation of the shaft.

Unbalance vibrators of this type are utilised for example in road construction machines for generating vibrations. In a known unbalance vibrator (German Auslegeschrift No. 12 85 777) a shaft with a flyweight rigidly connected thereto is mounted in a housing. Movable flyweights of generally semicircular sector shape are freely rotatably mounted on the shaft on both sides of the flyweight. The flyweight rigdly connected carries, in a rubber-metal-connection, a dog the axis of which is parallel to the shaft, and which engages semicylindrical recesses of the novable flyweights when the shaft is rotating, and which takes along these movable flyweights. Depending on the direction of rotation of the shaft the vibrating force is larger or smaller, depending on the way how the centrifugal force of the flyweight rigidly connected to the shaft is geometrically added to the centrifugal force of the movable flyweights.

Belgian Pat. No. 529,896 discloses an unbalance vibrator having two flyweights which are rotatable relative to each other between first and second stop positions. One flyweight is driven by a drive motor. The other flyweiht is mounted freely rotatably on a stationary axle. In the first stop position, the other flyweight engages a first stop on the first flyweight, and, in the second stop position, it engages a second stop on the first flyweight. In the first stop position, the two flyweights are angularly spaced by substantially 180°, whereby practically no resultant centrifugal force occurs. In the second stop position, the flyweights point substantially into the same direction, whereby maximum exciting force is achieved. A centrifugal force controlled pawl mechanism interlocks the two flyweights, once in the first stop position, and once in the second stop position. The interlocking in the first stop position is released during run-up, when the rotational speed has exceeded a certain minimum value. In the second stop position, the interlocking is released, when the rotational speed, upon deenergization of the unbalance vibrator, drops below a certain value. Re-locking in the first stop position is then achieved by the directly driven flyweight having a smaller moment of inertia than the freely rotating flyweight, wherby, upon deenergization of the drive means, the former flyweight loses speed faster than the latter one. Thereby the flyweights get into the first stop position relative to each other in which the pawl mechanism is re-engaged.

French Pat. No. 1,601,552 discloses an unbalance vibrator having a flyweight adjustable depending on rotational speed. With this design the flyweight is displaced radially by the centrifugal force against the action of a spring. In this way running-up of the unbalance vibrator is to be facilitated- as with the above mentioned Belgian Pat. No. 529 896. Such a construction is rather complex. The unbalance is a function of rotational speed. Thus any increase of the unbalance always requires an increase of the rotational speed. This is often undesirable, as centrifugal force is a square function of rotational speed anyhow. Therefore though the prior art device permits easier running-up of the unbalance vibrator, it does not permit operation with different unbalances at the same rotational speed, or with small unbalance a high rotational speeds and with large unbalance at small rotational speeds.

U.S. Pat. No. 2,860,783 discloses a vibration generator with two flyweights which are rotatably mounted side-by-side on a shaft portion. A housing is keyed to the shaft portion and encloses the flyweights. The housing has a pair of stops for each flyweight, the flyweights being movable between these stops relative to the housing. When each flyweight engages one stop of the associated pair, they are angularly spaced by substantially 180°, whereby their centrifugal forces cancel each other. When the flyweights engage the respective other stops of the pairs, maximum unbalance is obtained. The shaft portion is eccentric, whereby the housing with the flyweights makes a circular motion. Thereby the flyweights tend to move into the position of maximum unbalance. A ratchet mechanism having a centrifugal force controlled pawl retains the flyweights in the 180° spaced positions in engagement with the former stops up to a certain rotational speed. Upon deenergization of the unbalance vibrator, the ratchet mechanism causes the flyweights to return to this position.

French published patent application No. 2,382,950 discloses an unbalance vibrator comprising a first flyweight fixedly connected to a motor driven unbalance shaft and a second flyweight rotatably mounted on the unbalance shaft. The second flyweight can be taken along by the first flyweight, through a stop, in an angular position which is angularly spaced by 180° from the first flyweight. The second flyweight can optionally be coupled with the first flyweight at another angular position by means of a shifting shaft extending coaxial in the unbalance shaft, and through a radial arm and a stop.

It has been proved by practice, with unbalance vibrators of the type defined in the beginning, that undesired variations of the centrifugal force may be caused by the inertia of the movable flyweights, when the rotational speed of the shaft varies. If for example a vibration roller is used on relatively soft underground as bituminous pavement, it is operated only with reduced resultant centrifugal force, that is with the movable flyweights being in anti-phase position to the flyweight rigidly connected. When the vibration roller is deenergized or reversed, the unbalance vibrator runs out, and the movable flyweights disengage the dog due to their inertia. Thereby the resultant centrifugal force of the unbalance vibrator and therewith the compacting effect of the vibration roller may increase in undesired manner, whereby damages of the worked surface may be caused.

Thus it is the object of the invention to provide an unbalance vibrator of the type described hereinbefore in which no harmful variations of the resultant centrifugal force may be caused by the inertia of the movable flyweights.

According to the invention this object is achieved in that a locking member is provided, which is movable into a locking and into a releasing position as a function of rotary speed the movable flyweight is retained in engagement with the dog in the locking position of the locking member and in that the locking member is held in its locking position as long as the rotary speed of the shaft is higher than a shifting rotary speed at which the larger unbalance generates the same exciting force as the smaller unbalance at its operational rotary speed.

Displacement of the movable flyweight on the circumference of the shaft due to inertia, when the road construction machine is reversed or stopped, is prevented in the unbalance vibrator according to the invention by a locking member, which is movable as a function of rotary speed and is moved into releasing position only at such a low rotary speed, that displacement of the movable flyweight due to inertia does not cause intolerable variations of the vibrating force any more. Contrary to German Auslegungsschrift No. 1 285 777, in the unbalance vibrator of the invention, the movable flyweight is locked in its position corresponding to the smaller unbalance by a locking member operated depending on the rotary speed. The invention is based on the discovery, not taught by German Auslegeschrift No. 1 285 777, that otherwise intolerably high exciting forces might occur and on making it an object to avoid such intolerably high exciting forces. The rotary speed at which the flyweights are released are defined by a specific relation with the exciting forces generated with the two modes of operation. Contrary to Belgian Pat. No. 529 896, the problem of the invention is not the unbalance-free running-up (in one direction of rotation) but the generation of different unbalances with clockwise and counterclockwise rotations. The Belgian patent, in turn, does neither present nor solve the problem of the admissible vibratory force being exceeded upon deenergization or during reversal of the unbalance vibrator.

Advantageously the shifting rotary speed is equal to the loading rotary speed for the greater unbalance especially in road construction machines, the unbalance vibrator of which runs in different directions of rotation with different operational rotary speeds. The loading rotary speed is that rotary speed, at which the exciting force of the unbalance vibrator is just no longer sufficient to overcome the axle loading of the construction machine and to cause a jumping operation of the roller barrel. Advantageously the shifting rotary speed is lower than the loading rotary speed in order to safely exclude harmful influences when the movable flyweights are moved due to inertia. In the unbalance vibrator according to the invention the locking member may be a spring loaded locking bolt subjected to hysteresis, which may be moved radially outwards in a radial recess of the shaft by the effect of centrifugal force and restrained radially inwards by the force of a spring. In the locking position of the locking bolt the shifting rotary speed may be determined by the centrifugal force acting on the locking bolt being equal to the spring force acting on the locking bolt. The hysteresis is caused by the centrifugal force acting on the locking bolt due to different radial positions being larger in its locking position then in its releasing position, whereby movement of the movable flyweight during the run-up phase of the unbalance vibrator is safely unobstructed by movement of the locking bolt. It is also advantageous that the movable flyweight engages the locking bolt, while the unbalance vibrator is running out, because the transverse force resulting therefrom permits release of the locking bolt under the action of the spring only at a relatively low rotary speed. Further modifications of the invention is subject matter of the sub-claims.

An embodiment of the invention will now be described in greater detail with reference to the accompanying drawings.

FIG. 1 is a view of the unbalance vibrator

Figure 2:
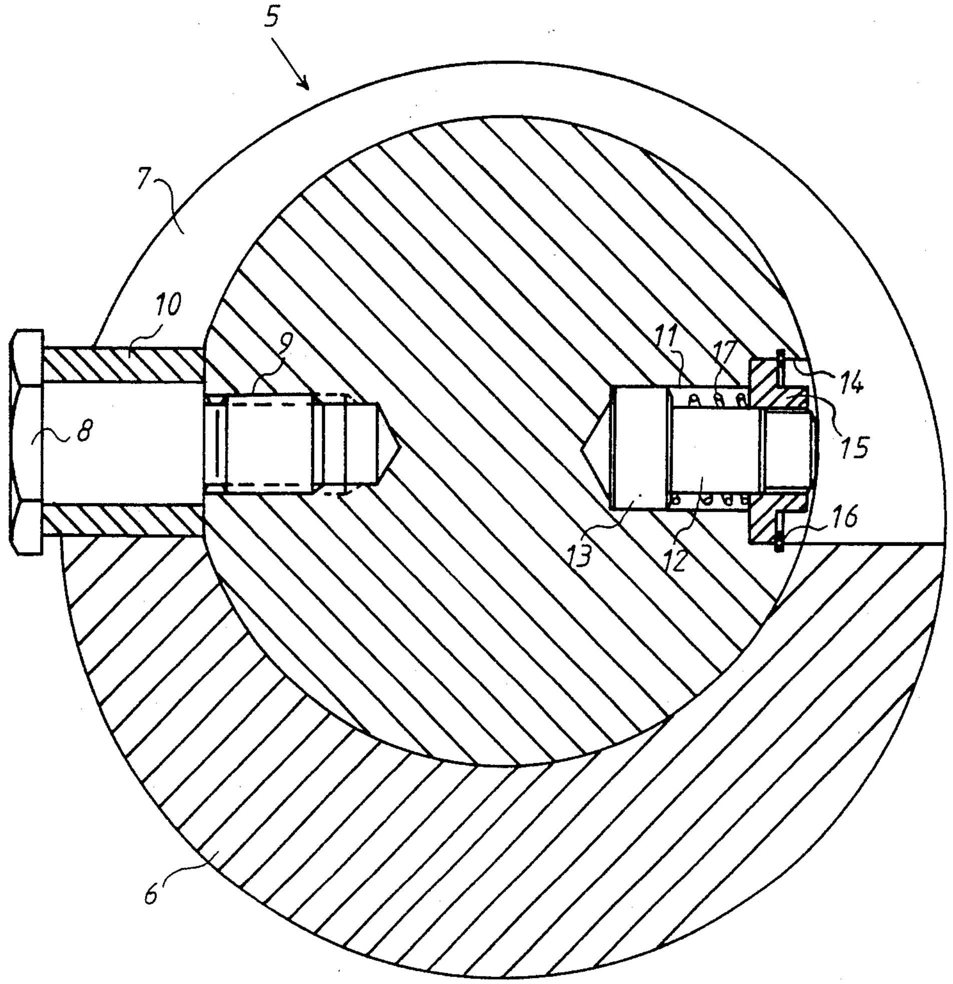

FIG. 2 a cross sectional view through a movable flyweight of the unbalance vibrator of FIG. 1.

FIG. 1 shows a bearing housing 1, in which a shaft 2 with a flyweight 3 rigidly connected thereto is mounted in bearings 4. One end of the shaft 2 extends out of the bearing housing 1 and is connected to a driving motor (not shown). Movable flyweights 5 freely-rotatable on the shaft 2 are provided on both sides of the flyweight 5 rigidly connected. Each movable flyweight 5 (compare FIG. 2) has an inner bore adapted to the outer diameter of the shaft 2 and eccentric with respect to the flyweight. One portion of the movable flyweight 5 is solid flyweight body 6 nearly semicircular in cross section, and the other portion comprises guiding rings 7 also nearly semicircular in cross section between the end faces of the flyweight body 6. A dog 8 in the form of a dog bolt, which extends between the guiding rings 7 and which is screwed into a radial threaded bore 9 at the circumference of shaft 2, prevents the movable flyweights 5 from axial displacement on the shaft 2. The radial bore 9 is angularly spaced by 90° from the center plane of the rigidly connected flyweight 3. In the area of the guiding rings 7 the dog bolt comprises a buffer ring 10 of resilient material to absorb shocks.

The shaft 2 comprises a stepped radial recess in form of a blind bore 11 on the side diametrically opposite the dog bolt. The blind bore 11 receives a locking member 12, which is formed as a locking bolt with a head 13 movable in the blind bore 11. The blind bore 11 has an enlarged portion 14 adjacent the circumference of the shaft 2, a guiding member 15 being inserted into this enlarged portion and being secured by a retaining ring 16. The locking member 12 is guided in the guiding member 15. A spring 17 biasing the locking member 12 into its retracted position shown is located between the guiding member 15 and the head 13. In the state of rest of the unbalance vibrator its components can assume the positions shown in FIG. 2. The locking member 12 is retracted in the blind bore 11 and the movable flyweights 5 are disposed in their lower extreme positions, in which they engage the dog bolt 8 with one end face. When the unbalance vibrator rotates counterclockwise, the dogs 8 take along the movable flyweights 5 without variation of their position relative to the shaft 2 and of their phase position relative to the flyweight 3 rigidly connected. The centrifugal force acting on the locking members 12 increases with increasing rotary speed of the shaft 2, which centrifugal force eventually overcomes the force of the respective spring 17, such that the locking members 12 extend out of the blind bores 11 into the space between the guiding rings 7. As long as the locking members are in this position, substantial diplacement of the movable flyweights 5 relative to the shaft 2 is prevented. The same is true for the case when the shaft 2 is driven with the same starting position in inverse direction of rotation, that is clockwise. In that case the movable flyweights 5 slow-down relative to the shaft 2, until the dog 8 engages the opposite end face of the movable flyweights 5, and they are taken along, when the shaft 2 continues to rotate.

When the rotary speed of the shaft 2 is reduced during operation of the unbalance vibrator, the dogs 8 would lag the movable flyweights 5. That is, however, prevented by the engagement of the locking member 12.

Only when the rotary speed has been reduced to a rotary speed, at which the force of the spring 17 overcomes the centrifugal force acting on the locking member 12 and the transverse force caused by the respective movable flyweight 5 engaging the locking member 12, the locking member 12 is retracted and the movable flyweight 5 is permitted to move relative to the shaft, the phase position of the movable flyweights 5 also varying relative to the rigidly connected flyweight 3. The springs 17 are so dimensioned that the locking members 12 are only retracted at a shifting rotary speed in the order of 80% of the loading rotary speed. This ensures that the movable flyweights are only then moved due to inertia independently of the respective operational rotary speed, when this movement does no longer affect the effect of the road building machine. Further safety of operation is ensured by the fact that a transverse force results by the movable flyweight 5 engaging the locking member 12. This transverse force counteracts the pull-back force exerted on the locking member 12 by the spring 17. In the retracted releasing position, the locking member is disposed at a smaller distance from the axis of rotation of the shaft 2; Thus a higher rotary speed is required to generate a centrifugal force overcoming the force of the spring 17, than the rotary speed at which the locking member is retracted from the locking position. The hysteresis resulting therefrom ensures the locking members 12 to be moved into the locking position only, when the movable flyweights 5 are in their operational position. This hysteresis is intensified by the transverse force mentioned above.

We claim:

1. An unbalance vibrator including a shaft which is driven in reversible directions, comprising:

(a) a housing (b) said shaft being rotatably mounted in said housing about an axis of rotation, (c) first flyweight means provided on said shaft and rotatable therewith, (d) second flyweight means rotatably mounted relative to said first flyweight means about said axis of rotation, (e) dog means on said shaft, and (f) first and second engagement surfaces of said second flyweight means on peripherally opposite sides therof, (g) said dog means being arranged to engage said first engagement surface in a first operative position of said flyweight means when said shaft is driven in one direction and to engage said second engagement surface in a second operative position of said flyweight means when said shaft is driven in the opposite direction, (h) said first and second flyweight means having a relatively large resultant unbalance when in said first operative position, and having a relatively small resultant unbalance when in said second operative position, (i) a locking member arranged for rotation which said shaft and radially movable between a locking position and a releasing position, (j) said locking member being arranged to engage said second engagement surface when said locking member is in said locking position and said flyweight means are in their first operative position, and to engage said first engagement surface when said locking member is in said locking position and said flyweight means are in their second operative position, and to release said second flyweight means when said locking member is in its releasing position, (k) spring means for urging said locking member towards its releasing position, whereby, in operation, said locking member is held in its releasing position at relatively low rotary speeds and is moved into its locking position when a predetermined rotary speed of said shaft is exceeded.

2. Unbalance vibrator as set forth in claim 1, characterized in that the locking member (12) is arranged in the shaft (2).

3. Unbalance vibrator as set forth in claim 2, characterized in that the locking members is a locking bolt which is subject to hysteresis and is movable radially outwards under the action of centrifugal force and is restrained radially inwards by the force of said spring means (17), and that in the locking position of the locking bolt the predetermined rotary speed is determined by the condition that the centrifugal force acting on the locking bolt is equal to the spring force acting on the locking bolt.

4. Unbalance vibrator as set forth in claim 3, characterized in that the locking bolt is located in a blind bore adapted to accomodate the outer diameter of a head (13) of the locking bolt and having a radially outer, enlarged portion (14), that a guiding member (15) for the locking bolt is is inserted into the enlarged portion and that the spring means (17) is supported by the guiding member (15) and the head (13).

5. Unbalance vibrator as set forth in claim 1 characterized in that the locking member (12) and the dog means (8) are arranged on the shaft (2) spaced from each other along the circumference and associated with said oppositely situated engagement surfaces of the second flyweight means (5), and that the second flyweight means (5) includes two parallel guiding rings (7) extending between its engagement surfaces.

6. Unbalance vibrator as set forth in claim 5, characterized in that the dog means (8) is a dog bolt screwed into a radial bore (9) of the shaft (2) and including a buffer ring (10) in the area of the guiding rings (7).

* * * * *